Nov. 12, 1940.　　　G. LARGE　　　2,221,099
CULTIVATOR
Filed May 11, 1939　　2 Sheets-Sheet 1

INVENTOR.
GEORGE LARGE
BY John W. Michael
ATTORNEY.

Nov. 12, 1940.  G. LARGE  2,221,099
CULTIVATOR
Filed May 11, 1939  2 Sheets-Sheet 2
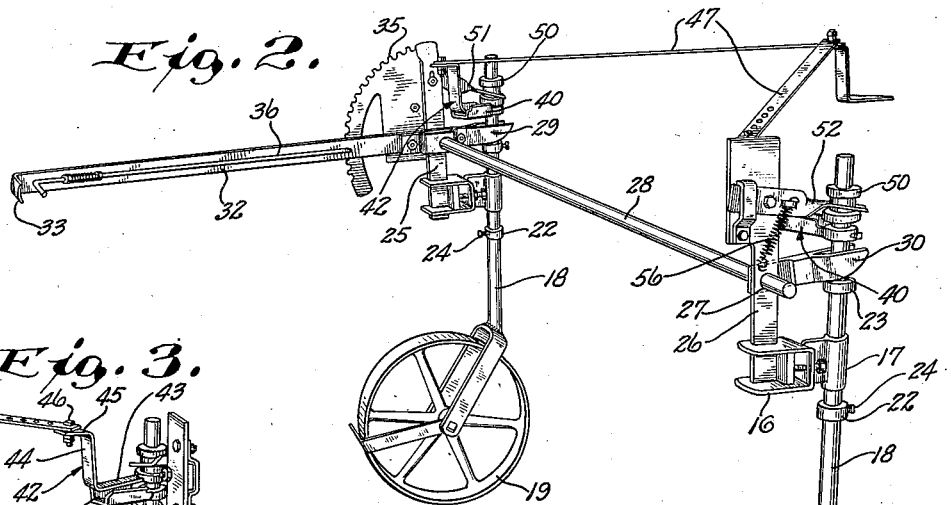
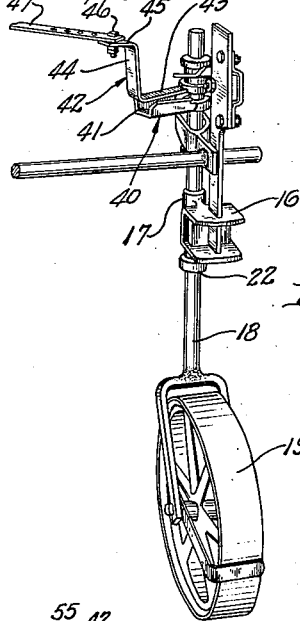
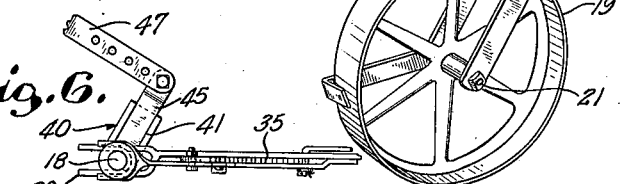
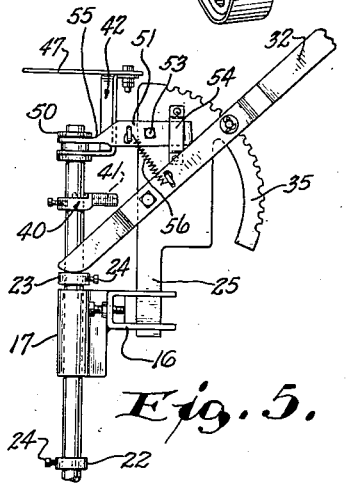
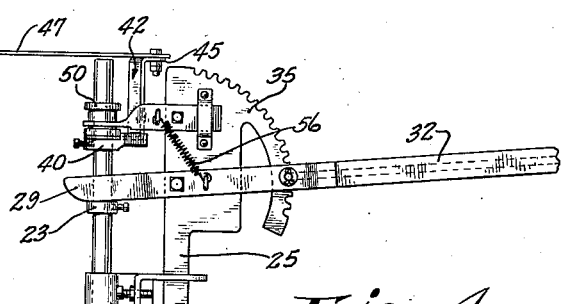
INVENTOR.
GEORGE LARGE
BY John W. Michael
ATTORNEY.

Patented Nov. 12, 1940

2,221,099

UNITED STATES PATENT OFFICE 2,221,099

CULTIVATOR

George Large, Port Washington, Wis., assignor to Harry W. Bolens, Port Washington, Wis.

Application May 11, 1939, Serial No. 273,019

5 Claims. (Cl. 97—48)

This invention relates to an improvement in agricultural machinery such as cultivators, and more particularly to an improved mechanism provided for steering and turning the cultivator.

A cultivator of the type contemplated by the present invention is one which employs a tractor to pull the implements across the field or along the furrows or rows and one which is equipped with gauge wheels assembled in supporting relation to the implement carrying bar so as to control the depth to which the implements operate and also to take the torque reaction of the tractor.

One of the principal objects of the present invention is to provide an improved mounting and control for the gauge wheels whereby they are automatically constrained to follow the tractor under normal conditions, as for example, when the cultivator is proceeding along a row or across a field, and yet they may be readily released so as to be free to swivel when the tractor is to be turned at the end of the row.

This has the advantage of giving the operator much easier and better control over the steering and turning of the tractor and makes the action much quicker and requires the expenditure of much less effort or labor.

Another object of the invention is to provide a device of this character and having these advantages and wherein the operating means for controlling the action of the gauge wheels is combined with the lift for the implements so that the actuation of a single lever will effectively lift the implements clear of the ground and also release the gauge wheels for free swivel movement or for action as caster wheels. Conversely, when the lever is manipulated to lower the implements into their operative ground engaging position the gauge wheels are automatically connected up with their control mechanism so as to be constrained to follow the movements of the tractor.

A still further object of the present invention is to provide an agricultural machine of the character specified and which is simple and durable in construction, reliable and efficient in operation, easily controlled, and subsequent of convenient and economical manufacture.

Other objects and advantages reside in certain novel features of the construction, arrangement and combination of parts which will be hereinafter more fully described and particularly pointed out in the appended claims, reference being had to the accompanying drawings forming a part of this specification, and in which:

Figure 2 is a perspective view showing the gauge wheels, the lift, and the control mechanism for the gauge wheels in which the present invention is embodied;

Figure 3 is a fragmentary perspective view showing the control mechanism for one of the gauge wheels as viewed from the inside;

Figure 4 is a fragmentary view in side elevation illustrating one of the gauge wheels and its control mechanism and also showing the lift lever in the position it assumes when the implements are lowered into ground engaging or working position;

Figure 5 is a view generally similar to Figure 4 but showing the lift lever as positioned when the implements are lifted from the ground and the gauge wheels are released to function as freely swiveled or caster wheels; and Figure 6 is a fragmentary view in top plan of the structure shown in Figure 4.

Figure 1:
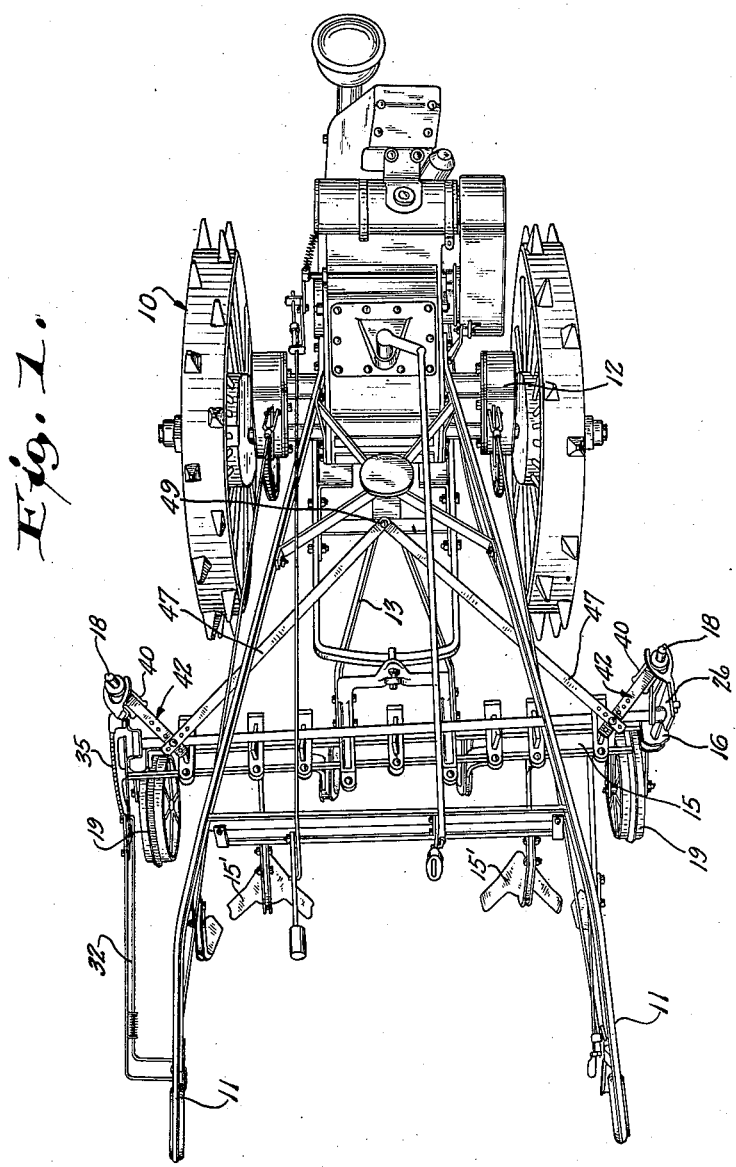
Figure 1 is a perspective view of an agricultural machine embodying the present invention as viewed from above.

Referring to the drawings, the numeral 10 designates a tractor which may be of any conventional or standard type. A pair of handles 11 extend rearwardly from the tractor and are utilized by the operator to aid in steering or controlling the tractor, although the present type of machine also proposes a clutch and brake arrangement 12 between the power plant of the tractor and the tractor wheels to utilize the power of the tractor also for steering purposes. This feature of the cultivator forms no part of the present invention as it is described and claimed in Patent No. 1,734,718 granted to Forrest V. Donald, on November 5, 1929, for "Transmission unit."

The cultivator in the present invention includes an implement carrying bar 15 to which the cultivating tools or implements 15' are secured. A hitch 13 is provided between the bar 15 and the frame of the tractor and includes a vertical pivot to allow the bar 15 and the implements to swing and follow the tractor. The ends of this bar are firmly secured and supported in brackets 16. The brackets 16 each have rigidly attached thereto a vertically disposed sleeve-like bearing 17. The bearings 17 slide freely on the vertical spindles 18 of the caster wheels 19, the spindles 18 having forks 20 at their lower ends which straddle the gauge wheels and rotatably interrelated with the wheels 21 thereof. The extent to which the sleeve 17 may slide on the spindles 18 is limited by collars 22 and 23 secured to the spindles 18 by set screws 24. Supporting standards 25 and 26 are secured at their lower ends to the bracket 16 and extend upwardly therefrom for a substantial distance. These standards 25 and 26 are disposed in transverse alinement to each other and have transversely alined bearing openings 27 formed therein. A rock shaft 28 extends transversely between the standards 25 and 26, through the transversely alined bearings thereof and beyond the same. Bifurcated rock arms 29 and 30 are fixed to the rock shaft and have their bifurcated portions straddling the spindles 18. The bifurcations of the rock arms have their lower edges curved so as to have wiping engagement with the collars 23 for a purpose which will hereinafter appear.

The lift lever 32 is fixed to the rock shaft 28 and may be formed as an extension of the rock arm 29. The rearward end of this lift lever is extended transversely as at 33 to provide for a convenient grasp thereof. For securing the lift lever in various adjustments, a segmental rack plate 35 is securely bolted or otherwise fastened to the upright 25 and a spring engaged, manually released detent 36 carried by the lever 32 coacts with the segmental rack plate.

With this construction, it is obvious that when the lift lever is positioned as shown in Figure 4, the implement carrying bar is lowered and the implements are in ground engaging or working position. By swinging the lift lever to the position shown in Figure 5 the rock arms 29 and 30 fulcrum against the collars 23 and the brackets 16, sleeve 17, and standards 26 as well as the implement carrying bar, are all slid up the spindles 18 of the gauge wheels.

This action is employed for the purpose of automatically converting the gauge wheels from freely swiveled or caster wheels to wheels which are automatically controlled or constrained to follow the tractor. For accomplishing this purpose a horizontal crank arm 40 is fixed to each spindle 18 above the collar 23. Beyond its hub portion or the portion thereof which is fixed to its spindle 18, each crank arm 40 is formed in its upper face with a longitudinally extending channel or socket 41. Cooperable with each crank arm 40 is an actuating lever 42. These actuating levers are of similar construction and they have horizontal portions 43 formed in their outer ends with apertured bearing portions 44' which are slidably and rotatably fitted on the spindles 18. The horizontal portions 43 when lowered are adapted to fit snugly in the channels 41 and provide a driving connection or a clutch connection between the operating levers 42 and the crank arms 40. The levers 42 also have upwardly bent portions 44 terminating in horizontal extremities 45 which are adjustably and pivotally connected as at 46 to control links 47. The levers 42 are connected to the rearward ends of the links 47. These links are angled across the cultivator in the manner of a V, as shown in Figure 1, and at their forward ends are pivotally connected as at 49 to the frame of the tractor.

With this construction, and with the lift lever in the position shown in Figure 4, and consequently with the levers 42 clutched to the crank arms 40, as the cultivator proceeds along the row the links 47 acting through the levers 42 and crank arms 40 will automatically constrain the gauge wheels to follow the course of the tractor.

In order that the gauge wheels may be converted to caster wheels or freely swiveling wheels, means is provided for automatically lifting the levers 42 and disengaging them from the crank arms 40 when the implements are lifted or the lift lever is swung to the position shown in Figure 5. This may be conveniently accomplished by constituting the bearing portion 43 of each lever 42 of spool formation as designated at 50 in Figures 3, 4 and 5, and interconnecting this spool formation with the uprights 25 and 26 by means of connecting arms 51 and 52. These arms 51 and 52 are similar in construction. Each is connected to its upright by means of a bolt and nut 53 and a strap 54 and has a horizontally disposed, bifurcated outer end 55 interfitted with the flanges of the spool. The bolt 53 and strap 54 allow a limited pivotal movement of the arms 51 so that a spring 56 may be provided to bias the arms to swing downwardly slightly and hence aid gravity in causing the levers 42 to be clutched to the crank arms 40 when the lift lever is swung as shown in Figure 4.

A cultivator of the character described is one that may be very conveniently and economically manufactured and provides for a very much easier and better control by the operator over the steering and turning of the machine.

Many of the advantages of the invention may be realized especially in the smaller sizes without employing the lift mechanism or employing the releasable connection or clutch between the links 48 and the vertical spindles 18. Under such circumstances the links are connected at their forward ends to the tractor in the manner hereinabove described and their rearward ends are directly and pivotally connected to suitable levers fixed to and extending radially from the spindles 18.

While I have shown and described one construction in which the invention may be advantageously embodied, it is to be understood that the construction shown has been selected merely for the purpose of illustration or example and that various changes in the size, shape and arrangement of the parts may be made without departing from the spirit of the invention or the scope of the subjoined claims.

The invention claimed is:

1. A machine of the character described comprising a tractor, an implement carrying bar, a hitch between the tractor and the implement carrying bar, ground wheels connected in supporting relation to said bar, means interconnecting the ground wheels and the tractor to cause the ground wheels to automatically follow the tractor in its steering movements, said means including a clutch, and means for engaging and releasing the clutch so as to release the ground wheels for freely swiveling movement to facilitate turning of the machine.

2. A machine of the character described comprising a tractor, an implement carrying bar, a hitch between the implement carrying bar and the tractor, ground wheels connected in supporting relation to said bar, means interconnecting the tractor and the ground wheels to cause the ground wheels to automatically follow the steering movement of the tractor, and hand operated lift mechanism between said wheels and said bar, and means regulated in its action by said lift mechanism for releasing said wheels for freely swiveling movement to facilitate turning of the machine.

3. A machine of the character described comprising a tractor, an implement carrying bar, a hitch between the implement carrying bar and the tractor, ground wheels having vertical spindles slidably interfitted with said implement carrying bar, a hand operated lift mechanism between said bar and said spindles for raising and lowering the bar and maintaining it in various vertical adjustments, links pivotally interconnected at their forward ends to the tractor and extending rearwardly and outwardly therefrom, and motion transmission means between the rearward ends of the links and the spindles and including clutches engaged and released under the control of said hand operated lift mechanism.

4. A machine of the character described comprising a tractor, an implement carrying bar, a hitch between the implement carrying bar and the tractor, ground wheels having vertical spindles slidably interfitted with said implement carrying bar, a hand operated lift mechanism between said bar and said spindles for raising and lowering the bar and maintaining it in various vertical adjustments, links pivotally interconnected at their forward ends to the tractor and extending rearwardly and outwardly therefrom, crank arms fixed to the spindles and having channels, and operating levers slidably interconnected with the spindles and engageable in and disengageable from the channels and also interconnected with the rearward ends of the links, and means controlled by the hand operated lift mechanism for effecting engagement and disengagement of said operating levers and said crank arms.

5. A machine of the character described comprising a tractor, an implement carrying bar, a hitch between the implement carrying bar and the tractor, ground wheels having vertical spindles interconnected with the implement carrying bar, levers interconnected with the spindles, and links pivotally interconnected at their forward ends to the tractor and extending rearwardly and outwardly therefrom and pivotally interconnected at their rearward end with said levers.

GEORGE LARGE.